United States Patent [19]

Larson

[11] 3,737,670

[45] June 5, 1973

[54] TOUCH SENSITIVE ELECTRONIC SWITCH

[75] Inventor: Willis A. Larson, Albuquerque, N. Mex.

[73] Assignee: Magic Dot, Inc., Minneapolis, Minn.

[22] Filed: July 9, 1971

[21] Appl. No.: 161,948

Related U.S. Application Data

[63] Continuation of Ser. No. 865,760, Oct. 13, 1969, abandoned.

[52] U.S. Cl. ..............................307/116, 200/DIG. 2

[51] Int. Cl. ..............................................H01h 3/12

[58] Field of Search .....................200/DIG. 2, 159 B, 200/DIG. 1, 159 R; 307/112, 116; 317/123 P, DIG. 1

[56] References Cited

UNITED STATES PATENTS

| | | | |
|---|---|---|---|
| 2,262,777 | 11/1941 | Roper | 200/159 B |
| 3,600,528 | 8/1971 | Leposaric | 200/159 B X |
| 2,659,533 | 11/1953 | Quinby et al. | 317/123 P |
| 2,576,929 | 12/1951 | Ercolmo | 200/159 A |
| 2,186,825 | 1/1940 | Dome | 200/DIG. 2 |

FOREIGN PATENTS OR APPLICATIONS

| | | |
|---|---|---|
| 652,974 | 3/1965 | Belgium |

OTHER PUBLICATIONS

Johnson, IBM Technical Disclosure Bulletin, Vol. 13, No. 11, April 1971, p. 3551 (Pushbutton Switch with no Moving Parts)

*Primary Examiner*—Robert K. Schaefer
*Assistant Examiner*—William J. Smith
*Attorney*—Wicks and Nemer

[57] ABSTRACT

In order to provide sensitive, touch responsive electronic switching, a pair of electrodes disposed in a unique configuration are coupled to a high gain amplifier such that relatively high resistance bridging across the electrodes will result in a positive switching condition at the output terminals of the high gain amplifier. In a first preferred embodiment of the invention, the pair of electrodes comprises a first centrally disposed electrode encompassed by a second, circular electrode disposed concentrically to, but longitudinally offset from the first electrode. Thus, the pair of electrodes substantially conform to the contour of an operator's finger which sets up a relatively high resistance path between the two electrodes when both are touched. The finite galvanic skin resistance is sensed and differentiated from the substantially infinite resistance normally existing between the two electrodes by high current gain amplification to provide a sharp change in current flow through a load connected to the output terminals of the high gain amplifier. The sharply differentiated state of the output terminals of the high gain amplifier may be utilized to control switching functions in any manner desired in subsequent stages. For use in environments in which the atmosphere may be contaminated or which may require the use of gloves by the switch operators, a membrane which has, on its underneath side, a conductive coating, is disposed over the pair of electrodes to perform the bridging function when the membrane is pressed against the electrodes.

16 Claims, 6 Drawing Figures

INVENTOR.
WILLIS A. LARSON
BY
Drummond, Cahill & Phillips
ATTORNEYS

INVENTOR.
WILLIS A. LARSON
BY
Drummond, Cahill & Phillips
ATTORNEYS

TOUCH SENSITIVE ELECTRONIC SWITCH

This is a continuation of Ser. No. 865,760, filed 10, 13, 69 now abandoned.

This invention relates to electronic switching and, more particularly, to apparatus for utilizing skin resistance or a comparable resistance, manually actuated, for providing discrete switching phenomena at the output terminals of an electronic circuit.

Prior art manually operated switches generally function on the mechanical principal of bringing two conductors into physical contact to complete a circuit through which current can flow. Because of the mechanical nature of the prior art switches, they are subject to wear and eventual failure as a result of the repeated operation of the moving parts, plating of material from one contact to the other because of unidirectional current flow, pitting, corrosion, and contamination in the form of accumulated dust, dirt, and chemical oxides formed by interaction between the contact material and the environmental atmosphere.

In an attempt to obviate the difficulties encountered by mechanical switches, touch responsive switches utilizing body capacitance or skin resistance have been proposed. However, these prior art touch responsive switches have been either very complex and costly to manufacture or somewhat dangerous because the voltages required to operate them are higher than desirable such that they have been deemed either impractical or useful only in applications in which high cost can be justified. Thus, it will be readily appreciated that a touch responsive switch which is highly reliable, safe, and lends itself to economical mass production would be highly desirable. Such a switch would find broad application for use with computer terminals, typewriter keyboards, calculator keyboards, control panels, and such other uses as require the entry of data through a primary switching interface unit.

It is therefore a broad object of this invention to provide an improved touch responsive switch.

It is a more specific object of this invention to provide a touch responsive switch utilizing a uniquely configured pair of electrodes coupled to a high gain amplifier.

It is another object of this invention to provide a variant configuration of the switching element electrodes which is unaffected by environmental contamination and which may be easily operated even if the operator is wearing gloves.

These and other objects of the invention are achieved, according to a first embodiment of the invention, by utilizing, as the operated switching element, a pair of electrodes comprising a first centrally disposed electrode encompassed by a second, circular electrode longitudinally offset from the first electrode such that the pair of electrodes substantially conform to the contour of an operator's finger. When the operator touches the two electrodes, a finite resistance path is set up between the two electrodes, and this condition is detected through the use of a high current gain amplifier whose last stage will reach saturation, or very near saturation, when even a relatively high resistance is placed across the electrodes to set up low level current flow into the input stage of the amplifier. However, when the resistance across the electrode is substantially infinite such that no current flows into the input stage, the last stage of the high gain amplifier is cut off. Thus, a load impedance may be driven by the final stage of the high gain amplifier in response to the differentiation between the resistance appearing between the two electrodes when they are bridged by galvanic skin resistance and when they are not bridged.

In a second embodiment of the invention particularly adapted for use in contaminated environments which might create a sufficiently low resistance between the two electrodes to set up an artificial "touch" condition, a membrane provided with a conductive coating on its underside is placed over the electrode pair to provide a seal against such contamination. When the membrane is pressed downwardly against the electrodes, the conductive coating performs the bridging function which is sensed through the high gain amplifier.

The subject matter of the invention is particularly pointed out and distinctly claimed in the concluding portion of the specification. The invention, however, both as to organization and method of operation, may best be understood by reference to the following description taken in connection with the accompanying drawings of which:

FIG. 7 is a partially cutaway perspective view of a variant configuration for the electrode housing which is particularly useful in contaminated environments.

Figure 1:
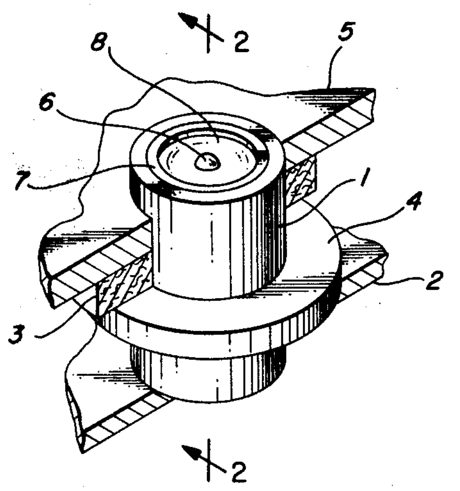
FIG. 1 is a perspective view of the switching system of the present invention showing the disposition of the inner and outer electrodes and housing especially adapted for printed circuit board use.
Figure 2:
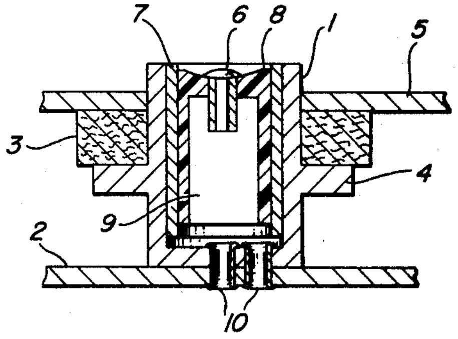
FIG. 2 is a cross section taken along the lines 2—2 of the housing illustrated in FIG. 1.

Referring now to FIGS. 1 and 2, a housing 1, which may be made of any suitable durable insulating material, is shown as it would be utilized with a printed wiring board. A dust seal 3 of foam rubber or the like is placed between the flange 4 of the housing 1 and a panel 5 through which the housing extends for manual access.

As best shown in FIG. 1, the electrode pair comprises a center electrode 6 and an annular electrode 7 concentrically disposed to the center electrode 6, but extending longitudinally upwardly beyond the uppermost limit of the center electrode. The center electrode 6 and the annular electrode 7 are separated and and held in their respective positions by an insulator ring 8. It will be observed in FIG. 2 that the insulator ring 8 takes the form of a hollow cylinder to provide a chamber 9 into which the electronic components of the high gain amplifier may be placed as will be discussed in detail below. A pair of hollow conductors 10 are imbedded in the bottom portion of the housing 1 to provide communication to the chamber 9. These hollow conductors permit a pair of leads to be brought from the chamber 9 to the lower surface of the printed wiring board 2 where they may be soldered into place in the usual manner. The solder will also adhere to the hollow conductors 10 to provide a certain degree of mechanical strength in attaching the switching system to the printed wiring board 2.

Figure 3:
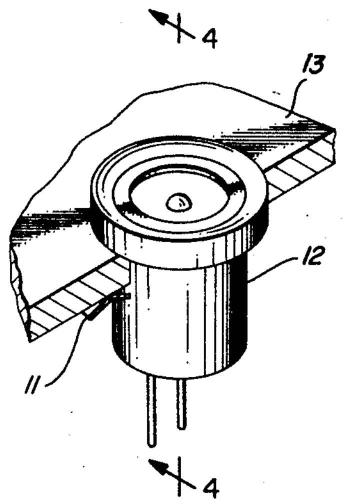
FIG. 3 illustrates a slightly altered physical configuration of the housing which renders it particularly suitable for panel mount operation.
Figure 4:
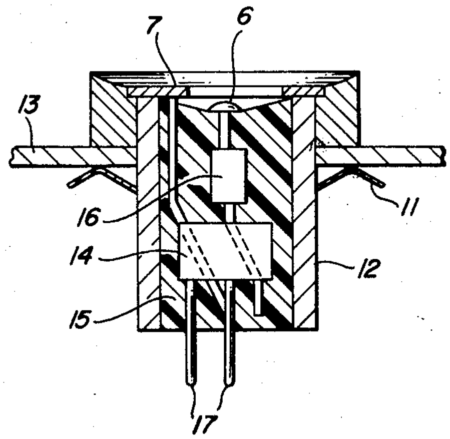
FIG. 4 is a cross section taken along the lines 4—4 of the housing illustrated in FIG. 3 and also shows the manner in which the electronic circuitry associated with the electrode pair may be contained within the housing.

FIGS. 3 and 4 illustrate a slightly differently configurated housing particularly adapted for panel mounting. The retainer clip 11 is utilized to hold the housing 12 tightly against the panel 13. It will be understood by those skilled in the art that the retainer clip 11 could be replaced by a nut, provided the lower portion of the housing 12 were threaded to receive the nut, or by any other suitable method of panel mounted.

The cross-sectional view of FIG. 4 illustrates an encapsulated high DC current gain amplifier 14 disposed within the chamber 15 of the housing 12. The chamber 15 is filled with potting material to provide structural strength to the assembly and protection against contamination or other deterioration which could result from prolonged exposure to the atmosphere. A current limiting resistor 16 is connected between the center electrode 6 and one of the input terminals to the amplifier 14. The annular electrode 7 is connected directly to a second input terminal to the amplifier 14. A pair of leads 17 are utilized as output terminals to an external load and an external power supply as will be discussed in conjunction with the schematic diagrams of FIGS. 5 and 6.

Figure 5:
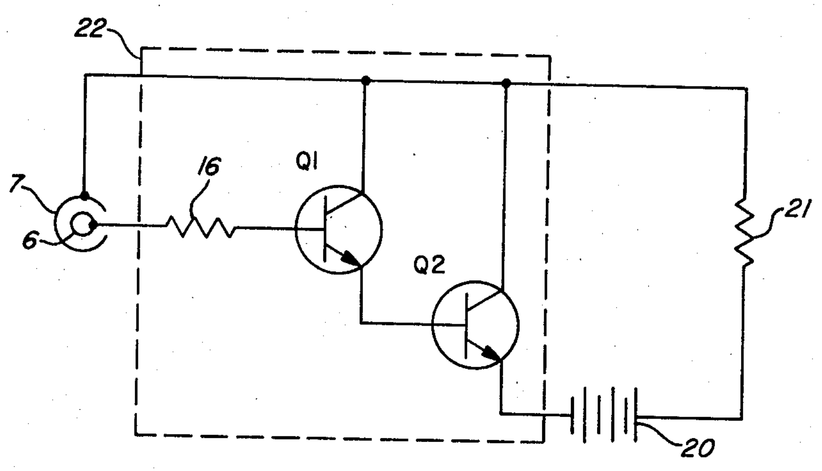
FIG. 5 is a schematic diagram of a rather straightforward Darlington amplifier which provides adequate gain to perform the electronic switching initiated by bridging the electrodes with galvanic skin resistance.

Referring now to FIG. 5, a basic Darlington amplifier circuit is presented which is connected to the electrode pair 6 and 7, to an external low voltage DC power supply represented by the battery 20, and to a current responsive load represented by the impedance 21. The elements enclosed within the dashed line 22 are contained within the cavity 9 of FIG. 2 or the cavity 15 of FIG. 4. It will be observed from an examination of FIG. 5 that only two leads need extend from the cavity; viz.: the negative lead from the power supply 20 to the emitter electrode of transistor Q2 and a lead which is common to one end of the current responsive load 21, the collector electrodes of the transistors Q1 and Q2, and the annular electrode 7.

In operation, when a substantially infinite resistance appears between the electrodes 6 and 7, no current will flow between the electrodes, and both the transistors Q1 and Q2 will be cut off such that no appreciable current flows through the current responsive load 21. Assuming the power supply 20 delivers nominally 5 volts and the current responsive load 21 to have a nominal value of 500 ohms, it has been found that a conductive path of as much as 10 megohms between the electrodes 6 and 7 will permit sufficient current to flow into the base electrode of the amplifier input transistor Q1 to bring output transistor Q2 into current saturation or very close thereto. Inasmuch as it has been shown that the galvanic skin resistance can vary from 20 kilohms to 10 megohms, it will be understood that the current passing through the current responsive load 21 can be switched from substantially zero to a full nominal value by placing the tip of ones finger such that the electrodes 6 and 7 are bridged. The basic operation of the high gain Darlington amplifier illustrated in FIG. 5 is well known and need not be discussed at length here. It may be pointed out, however, that a typical current gain for such a configuration would fall within the range of 20,000 to 100,000. As noted briefly above, the resistor 16 is placed within the circuit to limit the base current to the transistor Q1 to a safe level in case the electrodes 6 and 7 should be directly shorted with a metallic conductor or the like. With high gain transistors, such as 2N3904's used with a 5 volt power supply and 500 ohm load impedance, the resistor 16 may have a value of 1,000 ohms to afford adequate protection for the transistor Q1.

Figure 6:
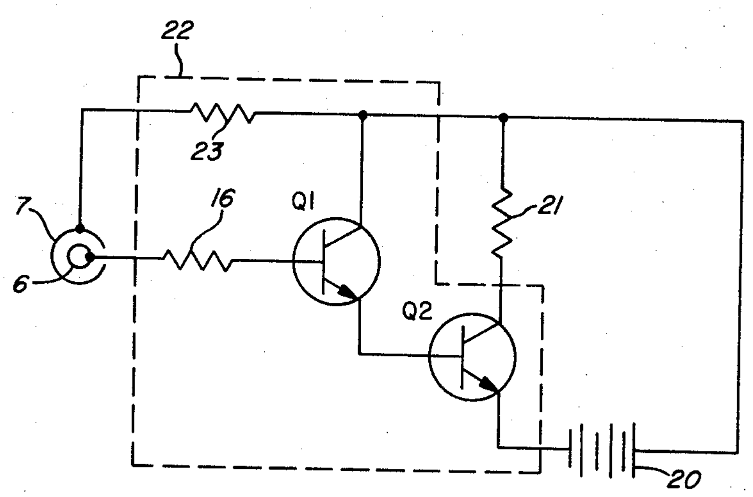
FIG. 6 is a schematic diagram of a slightly altered Darlington circuit which places more voltage across the electrode pair to insure saturation of the final amplifier stage.

While the circuit of FIG. 5 is entirely adequate for most applications, the slightly rearranged circuit of FIG. 6 may be used for increased sensitivity. The result of placing the current responsive load 21 directly in series with the transistor Q2 in the FIG. 6 configuration is to apply a higher voltage gradient across the electrodes 6 and 7. Thus, the same resistance brought to bear across the electrodes 6 and 7 in the FIG. 6 circuit configuration will result in a somewhat higher base current to the transistor Q1 than in the FIG. 5 configuration. The resistor 23 may be added optionally to limit the voltage to which the operator is exposed in the event of a power supply failure which would otherwise place a high voltage between the electrodes 6 and 7. Such a failure could take the form of a primary to secondary short in a power supply transformer (not shown) which conceivably could expose the operator to full line voltage if the resistor 23 were not provided.

The Darlington configurations of FIG. 5 and FIG. 6 are presented merely as exemplary of the high gain circuits which could be utilized. For example, it will be apparent to those skilled in the art that very sensitive applications might well require three stages of amplification rather than the two stages depicted. The current responsive load 21 can take any form necessary to achieve the switching function desired. For example, the load 21 may comprise a relay coil or subsequent high level electronic switching circuitry and may also include readout structure such as an incandescent lamp which may be optionally disposed within the housing supporting the electrodes 6 and 7 to be used with an electronic package permitting pushon-pushoff, latching, etc. response in addition to the normal momentary operation achieved with a simple current responsive load 21. Further, those skilled in the digital arts will understand that it is a simple matter to generate a multi-bit alpha-numeric code in response to a change of state of the output stage of the high gain amplifier.

Referring back to FIGS. 1 and 4, it is important to realize the significance of the configuration and disposition of the center electrode 6 and the annular electrode 7 with respect to one another. If it were possible to touch the center electrode 6 without first touching the annular electrode 7, the usual alternating voltage induced into the operator's body would cause the switching system to turn off and on at the alternating frequency, typically 60 Hz. Thus, the center electrode 6 is depressed below the level of the annular electrode 7 to assure a good contact of the finger with the latter before contact is made with the center electrode 6. By first contacting the annular electrode 7, the induced AC voltage is harmlessly grounded and a DC current path is set up as soon as the finger touches the center electrode 6. It is often important in keyboard use and general switching to provide a specified touch threshold. Touch threshold can be adjusted by varying the depth of the center electrode 6 with respect to the outer surface of the annular electrode 7, the deeper the center electrode with respect to the annular electrode, the heavier the touch required to force the fingertip into contact with both electrodes. Further, by providing the center electrode with a hemispheric shape, as depicted in FIG. 4, and by providing an inaccessible vertical portion to the annular conductor 7, salts and other contamination deposited from repeated touching of the switching with the fingers will not be able to set up a sufficiently conductive path to bring about undesired activation of the switching system.

While close attention to the physical configuration of the electrodes 6 and 7 will provide adequate protection against inadvertent actuation through interelectrode contamination in moderately contaminated environments, the alternative embodiment of the invention illustrated in FIG. 7 affords complete protection in even heavily contaminated environments. It will be observed that the electrodes 6 and 7 of the FIG. 7 embodiment are mutually oriented in the same manner as described above. However, the electrodes 6 and 7 are completely sealed from the environment by a membrane 25 which is provided with a conductive coating 26 on its inner surface. The membrane 25 is sufficiently flexible to permit deflection downwardly such that the conductive coating 26 will bridge the electrodes 6 and 7 to provide a low level current path supplied by the galvanic skin resistance in the previously discussed embodiments. The characteristics of the conductive coating 26 may advantageously be adjusted to provide the current limiting function of the resistor 16 thereby eliminating the necessity for the current limiting resistor as a discrete component. It will be observed that the FIG. 7 embodiment may be easily actuated even when the operator is wearing gloves, and the use of this embodiment may therefore be advantageous under certain conditions in which the atmosphere is not contaminated, but in which the galvanic skin resistance cannot be relied upon to perform the bridging function.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim

1. Electrical Switch Apparatus operable by the lateral bridging of the switch electrodes by the skin resistance of an operator, comprising in combination: insulating media having a top surface; first electrode means immovably arranged with the insulating media with the top surface of the first electrode exposed to the finger of an operator upon the top surface of the insulating media; second electrode means immovably arranged with the insulating media laterally around and about the first electrode with the top surface of the second electrode exposed to the finger of an operator upon the top surface of the insulating media laterally from the first electrode and with the top surface of the second electrode arranged above the level of the top surface of the first electrode in a manner that the finger of an operator touches the second electrode before contact is made between the finger and the first electrode to thereby allow good contact of the operator's finger with the second electrode before contact is made with the first electrode and thereby allow the harmless grounding of the usual alternating voltage induced from an external source into an operator's body and allow a direct current path to be set up laterally between the first electrode and the second electrode as soon as the finger of the operator touches the first electrode.

2. The electrical switch of claim 1 wherein the first electrode comprises a disc.

3. The electrical switch of claim 2 wherein the second electrode comprises an annulus surrounding the disc of the first electrode.

4. The electrical switch apparatus of claim 3, wherein the insulating media comprises a housing.

5. The electrical switch apparatus of claim 4, wherein the housing includes: space for a direct current amplifier; and coupling means for connecting the first and second electrodes to the input terminals of any direct current amplifier within the housing space.

6. The electrical switch apparatus of claim 1 comprising means for coupling the first and second electrodes to input terminals of an amplifier.

7. The electronic switch apparatus of claim 1 wherein the height difference between the level of the top surface of the first electrode and the level of the top surface of the second electrode is sufficient to establish a desired touch threshold for the switch.

8. Electronic switch apparatus operable by the bridging of the switch electrodes by the skin resistance of an operator, comprising in combination: insulating media having a top surface; first electrode means laterally immovably arranged with the insulating media with the top surface of the first electrode exposed to the finger of an operator upon the top surface of the insulating media;

second electrode means laterally immovably arranged with the insulating media and the first electrode laterally around and about, spaced, and insulated from the first electrode with the top surface of the second electrode exposed to the finger of an operator upon the top surface of the insulating media laterally from the first electrode and with the top surface of the second electrode arranged above the level of the top surface of the first electrode in a manner that the finger of an operator touches the second electrode before contact is made between the finger and the first electrode to thereby allow good contact of the operator's finger with the second electrode before contact is made with the first electrode and thereby allow the harmless discharge of voltage in an operator's body and allow a direct current path to be set up laterally between the first electrode and the second electrode as soon as the finger of the operator touches the first electrode; first means for providing an electrical connection to the first electrode; and second means for providing an electrical connection to the second electrode.

9. The electronic switch apparatus of claim 8 wherein the first connection means comprises means for providing an electrical connection between the first electrode and the input of a direct current amplifier.

10. The electronic switch apparatus of claim 9 wherein the second connection means comprises means for providing an electrical connection between the second electrode and a means for supplying DC voltage to the direct current amplifier.

11. The electronic switch apparatus of claim 10 wherein the height difference between the level of the top surface of the first electrode and the level of the top surface of the second electrode is sufficient to establish a desired touch threshold for the switch.

12. The electronic switch apparatus of claim 8 wherein the second connection means comprises means for providing an electrical connection between the second electrode and a means for supplying DC voltage to the direct current amplifier.

13. The electronic switch apparatus of claim 9 wherein the height difference between the level of the top surface of the first electrode and the level of the top surface of the second electrode is sufficient to establish a desired touch threshold for the switch.

14. The electronic switch apparatus of claim 8 wherein the height difference between the level of the top surface of the first electrode and the level of the top surface of the second electrode is sufficient to establish a desired touch threshold for the switch.

15. The electrical switch apparatus of claim 1 wherein the top surface of the first electrode extends from the top surface of insulating media and wherein the top surface of the second electrode extends from the top surface of the insulating media.

16. The electronic switch apparatus of claim 8, wherein the top surface of the first electrode extends from the top surface of insulating media and wherein the top surface of the second electrode extends from the top surface of the insulating media.

* * * * *